(12) United States Patent
Drory et al.

(10) Patent No.: US 12,112,196 B2
(45) Date of Patent: Oct. 8, 2024

(54) REAL-TIME SCHEDULING FOR A HETEROGENEOUS MULTI-CORE SYSTEM

(71) Applicant: GM Global Technology Operations LLC, Detroit, MI (US)

(72) Inventors: Guy Drory, Givataim (IL); Gilboa Shveki, Shoham (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 763 days.

(21) Appl. No.: 17/240,106

(22) Filed: Apr. 26, 2021

(65) Prior Publication Data

US 2022/0342702 A1    Oct. 27, 2022

(51) Int. Cl.
| | |
|---|---|
| G06F 9/48 | (2006.01) |
| G06F 9/38 | (2018.01) |
| G06F 9/50 | (2006.01) |
| G06F 9/54 | (2006.01) |
| G06F 15/78 | (2006.01) |

(52) U.S. Cl.
CPC .......... G06F 9/4881 (2013.01); G06F 9/3867 (2013.01); G06F 9/5027 (2013.01); G06F 9/544 (2013.01); G06F 15/7807 (2013.01)

(58) Field of Classification Search
CPC ...... G06F 9/4881; G06F 9/544; G06F 9/5027; G06F 15/7807; G06F 9/00–3897; G06F 15/76–825
See application file for complete search history.

(56) References Cited

U.S. PATENT DOCUMENTS

| | | | | |
|---|---|---|---|---|
| 7,734,833 B2* | 6/2010 | McKenney | ........... | G06F 9/5038 |
| | | | | 712/225 |
| 9,063,796 B2* | 6/2015 | Giusto | ................. | G06F 9/4881 |
| 9,971,631 B2* | 5/2018 | Kim | ..................... | G06F 13/4234 |
| 10,933,933 B2* | 3/2021 | Wells | .................... | G05D 1/0225 |
| 11,016,804 B2* | 5/2021 | Televitckiy | ........... | G06F 9/4887 |

(Continued)

OTHER PUBLICATIONS

Burgio et al.; "A software stack for next-generation automotive systems on many-core heterogeneous platforms"; 2017 Elsevier B.V.; http://dx.doi.org/10.1016/j.micpro.2017.06.016 (Burgio_2017.pdf; pp. 299-311) (Year: 2017).*

(Continued)

*Primary Examiner* — Hiren P Patel
(74) *Attorney, Agent, or Firm* — Vivacqua Crane, PLLC

(57) ABSTRACT

A heterogeneous multi-core system that executes a real-time system for an automobile includes a plurality of system-on chips in electronic communication with one another. Each system-on-chip includes a plurality of central processing units (CPUs) arranged into a plurality of logical domains. The heterogeneous multi-core system also includes a plurality of scheduled tasks that are executed based on an execution pipeline and each execute a specific set of tasks for one of the logical domains. The plurality of scheduled tasks includes at least one offset scheduled task that is executed at an offset time and a reference scheduled task located at an execution stage upstream in the execution pipeline relative to the offset scheduled task. The reference scheduled task communicates data to the offset scheduled task and the offset time represents a period of time measured relative to the reference scheduled task.

20 Claims, 4 Drawing Sheets

(56) References Cited

U.S. PATENT DOCUMENTS

| | | | |
|---|---|---|---|
| 11,526,378 B2* | 12/2022 | Hayashidera | G06F 9/485 |
| 11,539,638 B2* | 12/2022 | Esmail | H04J 3/1694 |
| 11,580,060 B2* | 2/2023 | Drako | G06F 9/45558 |
| 11,847,012 B2* | 12/2023 | Cormack | G06F 9/4881 |
| 11,855,799 B1* | 12/2023 | Hartung | H04L 12/40 |
| 2010/0060651 A1* | 3/2010 | Gala | G06T 15/005 |
| | | | 345/506 |
| 2011/0246998 A1* | 10/2011 | Vaidya | G06F 9/4881 |
| | | | 718/103 |
| 2013/0263100 A1* | 10/2013 | Mizrachi | G06F 8/4441 |
| | | | 717/149 |
| 2015/0244826 A1* | 8/2015 | Stenneth | H04L 67/568 |
| | | | 709/213 |
| 2019/0258251 A1* | 8/2019 | Ditty | G05D 1/0248 |
| 2021/0065379 A1* | 3/2021 | Zhang | G06V 10/82 |
| 2021/0377150 A1* | 12/2021 | Dugast | H04L 45/74 |
| 2022/0414503 A1* | 12/2022 | Park | G06F 9/4881 |

OTHER PUBLICATIONS

Liu et al. "Edge Computing for Autonomous Driving: Opportunities and Challenges"; 2019 IEEE; Digital Object Identifier 10.1109/JPROC.2019.2915983; (Liu_2019.pdf; pp. 1697-1716) (Year: 2019).*

* cited by examiner

REAL-TIME SCHEDULING FOR A HETEROGENEOUS MULTI-CORE SYSTEM

INTRODUCTION

The present disclosure relates to real-time scheduling for a high-performance heterogeneous multi-core system in an automobile. More particularly, the present disclosure relates to a heterogeneous multi-core system including real-time scheduling that provides guaranteed latency for each stage of an execution pipeline as well as guaranteed end-to-end latency.

A heterogeneous system-on-chip may include several different types of processors and shared memory. For example, a heterogeneous system-on-chip may include general purpose processors in combination with hardware accelerators, memory, and input/output (I/O) devices. One type of hardware accelerator is a graphics processing unit (GPU), which may be used for quickly rendering images and video in an infotainment application or for pre-processing sensor data and executing neural networks in an advanced driving assistance system (ADAS) for a vehicle. High-performance heterogeneous multi-core systems that share hardware accelerators may be found in a variety of real-time systems that perform tasks that need to be performed immediately with a certain degree of urgency. One example of a real-time safety-critical system is ADAS, which may employ data from sources such as, but not limited to, cameras, radar, global positioning systems (GPS), and mapping data to perform functions that assist a driver while operating a vehicle.

Some existing safety-critical systems for vehicles are based on legacy operating systems such as, for example, the Open Systems and their Interfaces for the Electronics in Motor Vehicles (OSEK) standard. Legacy operating systems that are based on the OSEK standard were originally written and intended for single-core processors, and do not scale well to multi-core processors. It is to be appreciated that operating systems based on the OSEK standard utilize periodic ring structures that execute at different rates. However, these types of legacy operating systems use priority based scheduling, where periodic rings having a higher execution rate complete before and are allowed to preempt periodic rings having a lower execution rate. Furthermore, these types of legacy operating systems do not consider hardware accelerators such as GPUs.

Many autonomous vehicles utilize software stacks based on event-driven scheduling such as, for example, the robot operating system (ROS), which effectively supports multi-core processors including shared hardware accelerators. However, these event-driven scheduling systems were not designed with real-time safety systems in mind, and as a result there is no mechanism to determine system latency. As a result, jitter may be accumulated at each step of the execution pipeline, without control.

Thus, while current scheduling systems achieve their intended purpose, there is a need in the art for a scheduling system that is scalable and effective for multi-core systems, and in particular to heterogeneous multi-core systems including hardware accelerators. There is also a need in the art for a scheduling system that guarantees end-to-end latency while still preventing jitter from accumulating.

SUMMARY

According to several aspects a heterogeneous multi-core system that executes a real-time system for an automobile includes a plurality of system-on chips in electronic communication with one another. Each system-on-chip includes a plurality of central processing units (CPUs) arranged into a plurality of logical domains. The heterogeneous multi-core system also includes a plurality of scheduled tasks that are executed based on an execution pipeline and each execute a specific set of tasks for one of the logical domains. The plurality of scheduled tasks includes at least one offset scheduled task that is executed at an offset time and a reference scheduled task located at an execution stage upstream in the execution pipeline relative to the offset scheduled task. The reference scheduled task communicates data to the offset scheduled task and the offset time represents a period of time measured relative to the reference scheduled task.

In another aspect, the offset time for the offset scheduled task is determined by selecting a value that captures a predefined percentage of a total runtime of all tasks that are executed to completion.

In yet another aspect, the execution pipeline includes a guaranteed end-to-end latency.

In still another aspect, each stage of the execution pipeline of the real-time system includes a guaranteed latency.

In another aspect, each logical domain executes one or more scheduled tasks. Each scheduled task executes based on a unique periodicity.

In another aspect, each of the plurality of system-on-chips include a corresponding shared memory.

In yet another aspect, a priority table indicating a runtime priority for each of the one or more scheduled tasks is stored in the shared memory.

In still another aspect, the runtime priority for each of the one or more scheduled tasks is determined based on the unique periodicity.

In an aspect, the heterogeneous multi-core system further comprises one or more synchronizers. The one or more synchronizers synchronize two or more inputs having different periodicities together and transmit data from the two more inputs to one of the plurality of scheduled tasks.

In another aspect, the heterogeneous multi-core system further comprises one or more synchronizers. The one or more synchronizers change a periodicity from a single input and transmits data from the single input to one of the plurality of scheduled tasks.

In yet another aspect, each of the plurality of scheduled tasks include a unique periodicity.

In still another aspect, each system-on-chip further comprises one or more hardware accelerators that are shared between the CPUs.

In one aspect, the real-time system is an advanced driving assistance system (ADAS).

In another aspect, each CPU is allocated to one of the plurality of logical domains.

In one aspect, a heterogeneous multi-core system that executes a real-time system for an automobile includes a plurality of system-on chips in electronic communication with one another. Each system-on-chip includes a plurality of CPUs arranged into a plurality of logical domains. The heterogeneous multi-core system also includes one or more synchronizers. The one or more synchronizers synchronize two or more inputs having different periodicities together. The heterogeneous multi-core system also includes a plurality of scheduled tasks that are executed based on an execution pipeline and each execute a specific set of tasks for one of the logical domains. The one or more synchronizers transmit data from the two more inputs to one of the plurality of scheduled tasks. The plurality of scheduled tasks includes at least one offset scheduled task that is executed at an offset time and a reference scheduled task located at an execution stage upstream in the execution pipeline relative to the offset scheduled task. The reference scheduled task communicates data to the offset scheduled task and the offset time represents a period of time measured relative to the reference scheduled task.

In another aspect, the offset time for the offset scheduled task is determined by selecting an that captures a predefined percentage of a total runtime of all tasks that are executed to completion.

In yet another aspect, the execution pipeline includes a guaranteed end-to-end latency.

In still another aspect, each stage of the execution pipeline of the real-time system includes a guaranteed latency.

In one aspect, a heterogeneous multi-core system that executes a real-time system for an automobile includes a plurality of system-on chips in electronic communication with one another, wherein each system-on-chip includes a plurality of CPUs arranged into a plurality of logical domains, one or more synchronizers, and a plurality of scheduled tasks that are executed based on an execution pipeline and each execute a specific set of tasks for one of the logical domains. The one or more synchronizers changes a periodicity from a single input and transmits data from the single input to one of the plurality of scheduled tasks. The plurality of scheduled tasks includes at least one offset scheduled task that is executed at an offset time and a reference scheduled task located at an execution stage upstream in the execution pipeline relative to the offset scheduled task. The reference scheduled task communicates data to the offset scheduled task and the offset time represents a period of time measured relative to the reference scheduled task.

In another aspect, the offset time for the offset scheduled task is determined by selecting an that captures a predefined percentage of a total runtime of all tasks that are executed to completion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
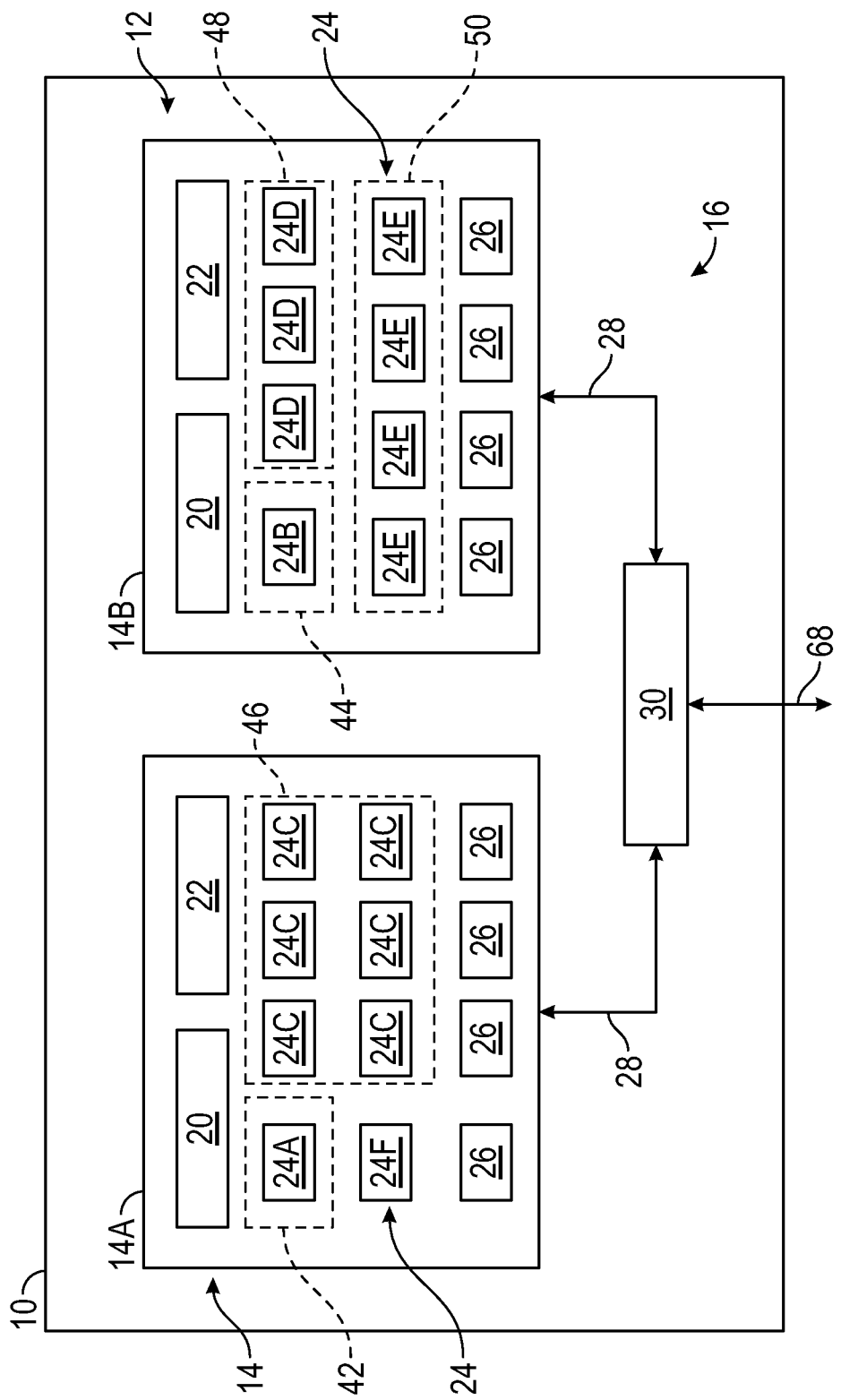
FIG. 1 is a physical view of an exemplary computer board including a plurality of system-on-chips for a real-time system according to an exemplary embodiment.

Referring to FIG. 1, a physical view of an exemplary computer board 10 is shown. The computer board 10 includes a high-performance heterogeneous multi-core system 12 having a plurality of system-on-chips 14. The heterogeneous multi-core system 12 executes a real-time system 16. In the non-limiting embodiment as described and shown in the figures, the real-time system 16 is an advanced driving assistance system (ADAS) for an autonomous automobile. As seen in FIG. 1, each system-on-chip 14 of the heterogeneous multi-core system 12 includes a corresponding shared memory unit 20, a shared storage 22, a plurality of central processing units (CPUs) 24, and one or more hardware accelerators 26. The one or more shared hardware accelerators 26 are shared between the CPUs 24 of each system-on-chip 14. The system-on-chips 14 of the computer board 10 are in electronic communication with one another by a communications line 28 that is connected to a communications switch 30. In the non-limiting embodiment as shown in FIG. 1, two system-on-chips 14A and 14B are illustrated, however, it is to be appreciated that this illustration is merely exemplary in nature and the computer board 10 may include any number of system-on-chips 14. Furthermore, although the figures describe the real-time system 16 as an ADAS for an autonomous automobile, it is to be appreciated that the figures are merely exemplary in nature. Indeed, the disclosed real-time system 16 is not limited to autonomous vehicles and may be used in a variety of other applications as well such as, for example, safety-critical aerospace and medical applications.

The CPUs 24 are configured to execute the control logic or instructions and may operate under the control of an operating system that resides in the shared memory unit 20. The operating system may manage computer resources so that computer program code embodied as one or more computer software applications, such as an application residing in memory, may have instructions executed by the CPUs 24. In an alternative embodiment, the CPUs 24 may execute the application directly, in which case the operating system may be omitted. One or more data structures may also reside in memory, and may be used by the CPUs 24, operating system, or application to store or manipulate data.

Figure 2:
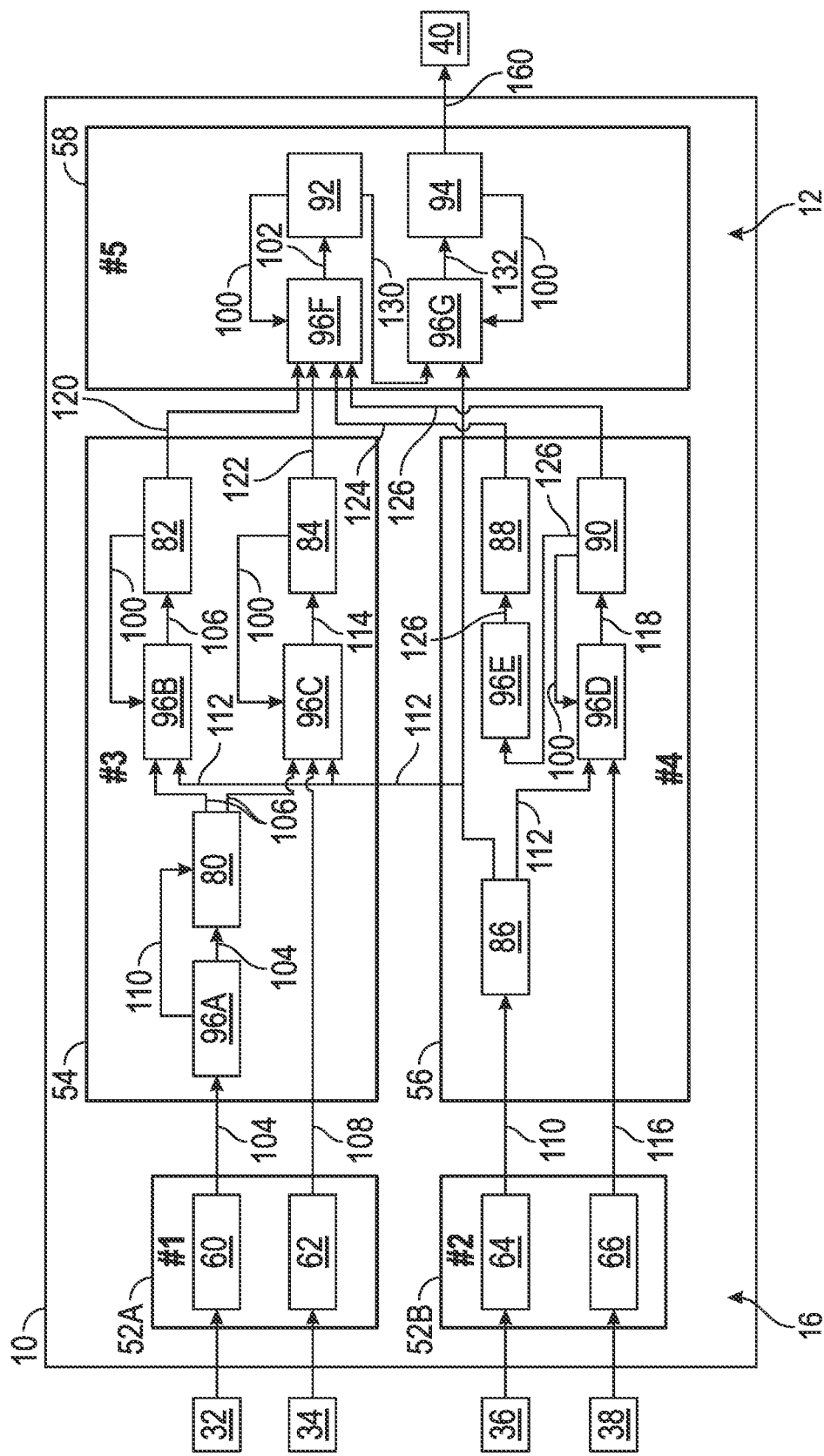
FIG. 2 is a logical view of the computer board shown in FIG. 1 according to an exemplary embodiment.

FIG. 2 is a logical view of the computer board 10 shown in FIG. 1. Referring to FIGS. 1 and 2, in the non-limiting embodiment as shown, the real-time system 16 is in electronic communication and transmits data to and receives data from one or more computing systems that are part of the autonomous vehicle via the communications switch 30 (FIG. 1). Specifically, in the exemplary embodiment as shown, the communications switch 30 of the computer board 10 is in electronic communication with a vehicle data bus 68 (FIG. 1) that receives data from a camera electronic control unit (ECU) 32, a radar ECU 34, an inertial measurement unit (IMU) ECU 36, and a global positioning system (GPS) ECU 38. The vehicle data bus 68 also transmits data from the computer board 10 to one or more vehicle propulsion and braking ECUs 40. However, it is to be appreciated that FIGS. 1 and 2 are exemplary in nature, and the computer board 10 may be in electronic communication with any number and type of computing systems using any number of communication interfaces.

In the non-limiting embodiment as shown in FIG. 1, the CPUs 24 of each system-on-chip 14 that are part of the heterogeneous multi-core system 12 are partitioned into CPU groups 42, 44, 46, 48, 50. Specifically, the five physical CPU groups 42, 44, 46, 48, 50 shown in FIG. 1 correspond to five logical domains 52A, 52B, 54, 56, 58 of the heterogeneous multi-core system 12, which are seen in FIG. 2.

Referring to FIGS. 1 and 2, a first CPU group 42 (seen in FIG. 1) corresponds to a first logical domain 52A (seen in FIG. 2) of the heterogeneous multi-core system 12. Referring to FIG. 2, the first logical domain 52A includes a camera driver 60 and a radar driver 62 that receive data from the camera ECU 32 and the radar ECU 34, respectively. A second CPU group 44 (seen in FIG. 1) corresponds to a second logical domain 52B (seen in FIG. 2). As seen in FIG. 2, the second logical domain 52B includes an IMU driver 64 and a GPS driver 66 that receive data from the IMU ECU 36 and the GPS ECU 38, respectively. A third CPU group 46 (seen in FIG. 1) corresponds to a third logical domain 54 (seen in FIG. 2) that performs perception functions based on the data received from the camera driver 60, the radar driver 62, and the IMU driver 64 (seen in FIG. 2). A fourth CPU group 48 (seen in FIG. 1) corresponds to a fourth logical domain 56 (seen in FIG. 2) and receives data from the IMU driver 64 and the GPS driver 66 (seen in FIG. 2). A fifth CPU group 50 (seen in FIG. 1) corresponds to a fifth logical domain 58 (seen in FIG. 2) and receives data from a lane tracking and fusion module 82 and an object tracking and fusion module 84 that are part of the third logical domain 54, and a map service module 88 and a localization module 90 (seen in FIG. 2) of the fourth logical domain 56. It is to be appreciated that the embodiment as shown in FIGS. 1 and 2 is non-limiting in nature, and the CPUs 24 may be arranged into any number of logical domains based on the specific needs of the real-time system 16.

The first CPU group 42 and the second CPU group 44 are both used to execute various device drivers 60, 62, 64, 66. Specifically, the first CPU group 42 includes one CPU 24A. The camera driver 60 and the radar driver 62 are both executed by the CPU 24A. The second CPU group 44 includes one CPU 24B, where the IMU driver 64 and the GPS driver 66 are both executed by the CPU 24B. The third CPU group 46 includes six CPUs 24C for executing the vision based detector module 80, the lane tracking and fusion module 82, and the object tracking and fusion module 84. The fourth CPU group 48 includes three CPUs 24D for executing the vehicle dynamics module 86, the map service module 88, and the localization module 90. The fifth CPU group 50 includes four CPUs 24E for executing the decision making module 92 and the vehicle control module 94. Finally, as seen in FIG. 1, the system-on-chip 14A includes a reserved CPU 24F.

As seen in FIG. 2, the heterogeneous multi-core system 12 includes a plurality of modules 80, 82, 84, 86, 88, 90, 92, 94, where each module executes a scheduled task associated with one of the logical domains 52A, 52B, 54, 56, 58. For example, in the embodiment as shown in FIG. 2, the real-time system 16 is an ADAS system including a vision based detector module 80, the lane tracking and fusion module 82, the object tracking and fusion module 84, a vehicle dynamics module 86, the map service module 88, the localization module 90, a decision making module 92, and a vehicle control module 94 for performing various scheduled tasks associated with the ADAS system.

Referring to FIG. 2, the heterogeneous multi-core system 12 may include one or more synchronizers 96. Specifically, in the non-limiting embodiment as shown, the heterogeneous multi-core system 12 includes six synchronizers 96A, 96B, 96C, 96D, 96E, 96F, 96G. In an approach, the synchronizers 96 synchronize two or more inputs 98 (FIG. 3) having different periodicities together and transmits a synchronized collection of the two or more inputs 98 to one of the modules 80, 82, 84, 86, 88, 90, 92, 94 that are part of the real-time system 16. In the alternative, the synchronizers 96 change a periodicity or a rate of execution from a single input 98 and transmits the data to one of the modules 80, 82, 84, 86, 88, 90, 92, 94 that are part of the heterogeneous multi-core system 12. In the example as shown in FIG. 2, the heterogeneous multi-core system 12 includes a first synchronizer 96A, a second synchronizer 96B, a third synchronizer 96C, a fourth synchronizer 96D, a fifth synchronizer 96E, a sixth synchronizer 96F, and a seventh synchronizer 96G.

Figure 3:
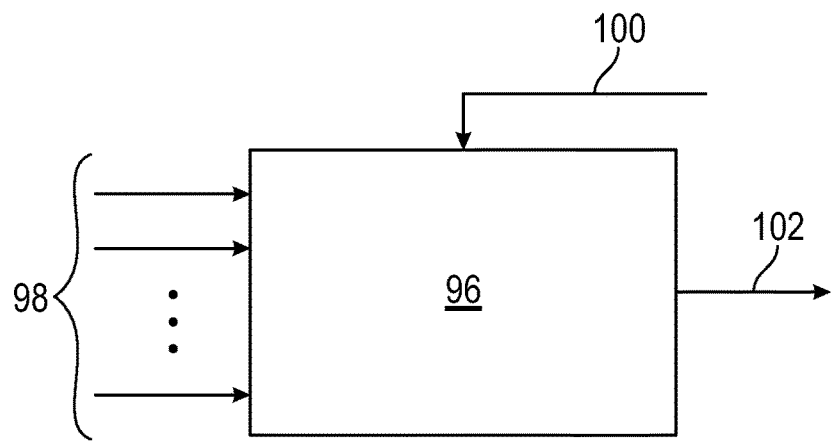
FIG. 3 illustrates one of the synchronizers shown in the logical view of the computer board of FIG. 2 according to an exemplary embodiment.

Referring to FIG. 3, each synchronizer 96 includes one or more inputs 98, a trigger 100, and an output 102. It is to be appreciated that each input 98 of the synchronizer 96 may include different rates of execution or periodicity, as well as different delays. For example, in the embodiment as shown in FIG. 2, the synchronizer 96D combines vehicle dynamics data 112 from the vehicle dynamics module 86, which includes a frequency of 100 Hertz and a delay of 30 milliseconds, with GPS data 116 from the GPS driver 66, which includes a frequency of 10 Hertz and a delay of 150 milliseconds, to create vehicle dynamics data 118 having a frequency of 10 Hertz. Thus, the output 102 (FIG. 3) of the synchronizer 96 may include a different execution rate when compared to the inputs 98.

Referring FIGS. 2 and 3, the trigger 100 for each synchronizer 96 represents a software event that prompts the synchronizer 96 to synchronize two or more inputs 98 (FIG. 3) having different periodicities together based on one or more pre-defined policies at a pre-defined period. The pre-defined policies are based on the specific application and vary based on the specific instance of the synchronizer 96. For example, the pre-defined policy may indicate which inputs 98 are mandatory and which inputs 98 may be omitted. The pre-defined policy may also indicate which actions need to be performed in the event a mandatory input is missing, or if specific inputs 98 are buffered in order to support backtracking. The trigger 100 is initiated by the module 80, 82, 84, 90, 92, 94 located downstream of the synchronizer 96 that the synchronizer 96 transmits data to. For example, as seen in FIG. 2, the trigger 100 for the first synchronizer 96A is initiated by the vision based detector module 80. As seen in FIG. 3, the synchronizer 96 generates a single output 102 that aggregates the one or more inputs 98. In an embodiment, the output 102 includes a status field message indicating a general status of the output 102 and field map indicating which inputs 98 are included in the output 102.

In an embodiment, the synchronizers 96 may be used to change the rate at which data is transmitted. For example, the synchronizer 96A that is part of the third CPU group 46 includes a single input 98 that receives raw camera data 104 from the camera driver 60 that is part of the first CPU group 42. The raw camera data 104 includes a frequency of 30 Hertz and the trigger 100 includes a period of 100 milliseconds. The output 102 of the synchronizer 96A is the raw camera data 104 having a frequency of 10 Hertz. Moreover, the synchronizer 96B that is also part of the third CPU group 46 includes a two inputs 98 and a trigger 100 having a period of 100 milliseconds. The synchronizer 96B receives camera detection data 106 from the vision based detector module 80 at a frequency of 10 Hertz and the vehicle dynamics data 112 from the vehicle dynamics module 86, which includes a frequency of 100 Hertz. The output 102 of the synchronizer 96B is the camera detection data 106 having a frequency of 10 Hertz.

Continuing to refer to FIGS. 2 and 3, the synchronizer 96C that is part of the third CPU group 46 includes three inputs 98 and a trigger 100 having a period of 50 milliseconds. Specifically, a first input 98 of the synchronizer 96C receives the camera detection data 106 from the vision based detector module 80 at a frequency of 10 Hertz, a second input 98 of the synchronizer 96C receives radar detection data 108 from the radar driver 62 at 20 Hertz, and a third input 98 of the synchronizer 96C receives the vehicle dynamics data 112 from the vehicle dynamics module 86 at a frequency of 100 Hertz. The output 102 of the synchronizer 96C is object data 114 having a frequency of 20 Hertz. A fourth synchronizer 96D includes two inputs 98 and a trigger 100 having a period of 100 milliseconds, where a first input 98 of the synchronizer receives the vehicle dynamics data 112 from the vehicle dynamics module 86 and a second input 98 receives the GPS data 116 from the GPS driver 66 at a frequency of 10 Hertz. The output 102 of the fourth synchronizer 96D is a combined GPS and vehicle dynamics data 118 having a frequency of 10 Hertz. A fifth synchronizer 96E includes a single input 98 and a trigger 100 having a period of 1000 milliseconds, where the input 98 of the fifth synchronizer 96E receives pose data 126 from the localization module 90 having a frequency of 10 Hertz. The output of the fifth synchronizer 96E is the pose data 126 having a frequency of 1 Hertz.

The sixth synchronizer 96F includes four inputs and a trigger 100 having a period of 100 milliseconds. Specifically, a first input 98 of the sixth synchronizer 96F receives tracked lane data 120 from the lane tracking and fusion module 82 having a frequency of 10 Hertz, a second input 98 of the sixth synchronizer 96F receives tracked object data 122 from the object tracking and fusion module 84 having a frequency of 20 Hertz, a third input 98 receives map service data 124 from the map service module 88 having a frequency of 1 Hertz, and the fourth input 98 receives the pose data 126 from the localization module 90 having a frequency of 10 Hertz. The output 102 of the sixth synchronizer 96F is state data 128 having a frequency of 10 Hertz. A seventh synchronizer 96G includes two inputs 98 and a trigger 100 having a period of 10 milliseconds. A first input of the seventh synchronizer 96G receives trajectory data 130 from the decision making module 92 having a frequency of 10 Hertz and a second input of the seventh synchronizer 96G receives the vehicle dynamics data 112 from the vehicle dynamics module 86. The output 102 of the seventh synchronizer 96G is a combined trajectory and vehicle dynamics data 132 having a frequency of 100 Hertz.

Table 1, which is shown below, illustrates an exemplary timer array for executing one of a plurality of scheduled tasks associated with one of the logical domains 52A, 52B, 54, 56, 58 for the real-time system 16. Referring to Table 1 and FIG. 2, each module 80, 82, 84, 86, 88, 90, 92, 94 of the heterogeneous multi-core system 12 includes a unique periodicity. In the example as shown in Table 3, the modules 80, 82, 84, 86, 90, 92, 94 includes an execution rate of 10 Hertz and the map service module 88 includes an execution rate of 1 Hertz, however, it is to be appreciated that Table 1 is merely exemplary in nature. Furthermore, it is to be appreciated that one or more of the scheduled tasks of the real-time system 16 are executed at an offset time 148 (seen in FIG. 4). Specifically, the plurality of scheduled tasks are executed based on an execution pipeline 150 (seen in FIG. 4) and include at least one offset scheduled task that is executed at the offset time 148 (FIG. 4) and a reference scheduled task. The reference scheduled task is located at an execution stage 152 upstream in the execution pipeline 150 (FIG. 4) and communicates data to the offset scheduled task, and the offset time 148 represents a period of time measured relative to the reference scheduled task.

Referring to FIG. 2 and Table 1, the vision based detector module 80 analyzes the raw camera data 104 from the camera driver 60 to detect surrounding vehicles that are on the roadway. As seen in Table 1, the vision based detector module 80 includes a detection function and a rate of 10 Hertz. The vehicle dynamics module 86 analyzes the IMU data 110 from the IMU driver 64 and generates the vehicle dynamics data 112 based on the IMU data 110. As seen in Table 1, the vehicle dynamics module 86 includes a rate of 10 Hertz. Since both the vision based detector module 80 and the vehicle dynamics module 86 are located at beginning execution stages 152 of the execution pipeline 150 (seen in FIG. 4) for the real-time system 16, there is no offset time 148 associated with either the vision based detector module 80 or the vehicle dynamics module 86.

TABLE 1

| Module # | Module Function | Unique periodicity (Hertz) | Offset to Module # | Execution Time (milliseconds) | Offset (milliseconds) |
|---|---|---|---|---|---|
| 80 | Vision based Detector | 10 | N/A | 80 | 0 |
| 82 | Lane Tracking and Fusion | 10 | 80 | 25 | 80 |
| 84 | Object Tracking and Fusion | 20 | 80 | 30 | 80 |
| 86 | Vehicle Dynamics | 100 | N/A | 100 | 0 |
| 88 | Map Service | 1 | 86 | 200 | 30 |
| 90 | Localization | 10 | 86 | 30 | 10 |
| 92 | Decision Making | 10 | 84 | 80 | 30 |
| 94 | Vehicle Controls | 100 | 92 | 20 | 80 |

Figure 4:
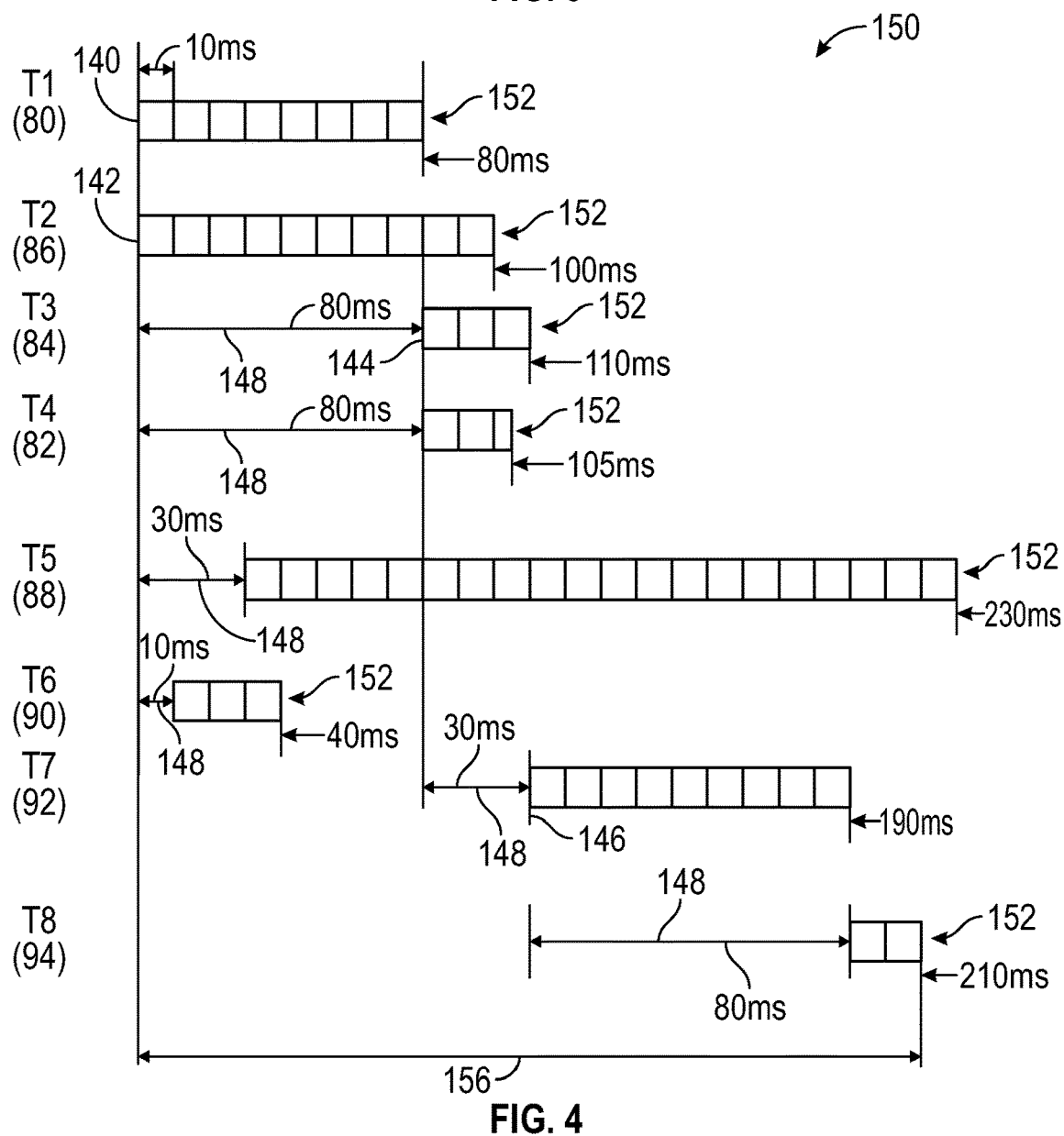
FIG. 4 illustrates an execution pipeline for the real-time system according to an exemplary embodiment.

The lane tracking and fusion module 82 receives the camera detection data 106 from the second synchronizer 96B. As seen in FIG. 2, the lane tracking and fusion module 82 is located downstream of the vision based detector module 80 in the execution pipeline 150 (FIG. 4). Accordingly, the lane tracking and fusion module 82 executes the offset scheduled task and the vision based detector module 80 executes the reference scheduled task in the present example. As seen in Table 1, the lane tracking and fusion module 82 includes an offset time of 80 milliseconds, where the offset time is relative to the vision based detector module 80.

Continuing to refer to Table 1 and FIG. 2, the object tracking and fusion module 84 receives the object data 114 from the third synchronizer 96C. The object tracking and fusion module 84 analyzes the object data 114 and generates the tracked object data 122 having a frequency of 20 Hertz based on the object data 114. Since the object tracking and fusion module 84 is located downstream of the vision based detector module 80 in the execution pipeline 150 (FIG. 4), the object tracking and fusion module 84 executes the offset scheduled task and the vision based detector module 80 executes the referenced scheduled task in the present example. As seen in Table 1, the object tracking and fusion module 84 includes an offset time of 30 milliseconds, where the offset time is relative to the vision based detector module 80.

The localization module 90 receives the combined GPS and vehicle dynamics data 118 from the fourth synchronizer 96D. Since the localization module 90 is located downstream from the vehicle dynamics module 86 in the execution pipeline 150 (FIG. 4), the localization module 90 executes the offset scheduled task and the vehicle dynamics module 86 executes the reference scheduled task. As seen in Table 1, the localization module 90 includes an offset time of 10 milliseconds, where the offset time is relative to the vehicle dynamics module 86.

The map service module 88 receives the pose data 126 from the fifth synchronizer 96E and generates the map service data 124 having a frequency of 1 Hertz. Since the map service module 88 is located downstream of the localization module 90 in the execution pipeline 150 (FIG. 4), the map service module 88 executes the offset scheduled task and the vision localization module 90 executes the referenced scheduled task in the present example. As seen in Table 1, the map service module 88 includes an offset time of 200 milliseconds, where the offset time is relative to the localization module 90. However, it is to be appreciated that the output of map service module 88 (which is the map service data 124) is also received as input by the decision making module 92. Thus, the decision making module 92 always consumes the latest data generated by the map service module 88. Thus, the execution pipeline 150, which is described in greater detail below, includes a guaranteed end-to-end latency 156 of 210 milliseconds.

The decision making module 92 receives the tracked lane data 120 from the sixth synchronizer 96F. As seen in FIG. 4, the decision making module 92 is located downstream in the execution pipeline 150 relative to the lane tracking and fusion module 82, the object tracking and fusion module 84, the map service module 88, and the localization module 90. The decision making module 92 includes an offset time of 80 milliseconds, where the offset time is relative to the object tracking and fusion module 84. Finally, the vehicle controls module 94 receives the combined trajectory and vehicle dynamics data 132 from the seventh synchronizer 96G and sends an output 160 to the to one or more vehicle propulsion and braking ECUs 40. The vehicle controls module 94 is located downstream of the vehicle dynamics module 86 as well as the decision making module 92 in the execution pipeline 150. As seen in Table 1, the vehicle controls module 94 includes an offset time of 80 milliseconds, where the offset time 148 is relative to the decision making module 92.

FIG. 4 is an illustration of the execution pipeline 150 for the real-time system 16, where T1 represents a first timer for the vision based detector module 80, T2 represents a timer for the vehicle dynamics module 86, T3 represents a third timer for the object tracking and fusion module 84, T4 represents a fourth timer for the lane tracking and fusion module 82, T5 represents a timer for the map service module 88, T6 represents a timer for the localization module 90, T7 represents a timer for the decision making module 92, and T8 represents a timer for the vehicle control module 94. Referring to FIGS. 2 and 4 and Table 1, the first timer T1 of the vision based detector module 80 includes an execution time of 80 milliseconds, and the third timer T3 of the object tracking and fusion module 84 includes an offset time 148 of 80 milliseconds relative to a start 140 of the first timer T1 for the vision based detector module 80. Thus, as seen in FIG. 4, the third timer T3 for the object tracking and fusion module 84 is initiated 80 milliseconds after the start 140 of the first timer T1. The fourth timer T4 of the lane tracking and fusion module 82 includes an offset time 148 of 80 milliseconds relative to the start 140 of first timer T1 of the vision based detector module 80. Thus, as seen in FIG. 3, the fourth timer T4 for the lane tracking and fusion module 82 is initiated 80 milliseconds after the start 140 of the first timer T1. The fifth timer T5 of the map service module 88 includes an offset time 148 of 30 milliseconds relative to the start 142 of the second timer T2. Thus, as seen in FIG. 3, the fifth timer T5 of the map service module 88 is initiated 30 milliseconds after the start 142 of the second timer T2.

The sixth timer T6 of the localization module 90 includes an offset time 148 of 10 milliseconds relative to the start 140 of second timer T2 of the vehicle dynamics module 86. Thus, as seen in FIG. 4, the sixth timer T6 for the localization module 90 is initiated 10 milliseconds after the start 142 of the second timer T2. The seventh timer T7 of the decision making module 92 includes an offset time 148 of 30 milliseconds relative to a start 144 of the third timer T3 of the tracking and fusion module 84. Thus, as seen in FIG. 4, the seventh timer T7 for the decision making module 92 is initiated 30 milliseconds after the start 144 of the third timer T3. The eighth timer T8 of the vehicle control module 94 includes an offset time 148 of 80 milliseconds relative to a start 146 of the seventh timer T7. Thus, as seen in FIG. 4, the eighth timer T8 for the vehicle control module 94 is initiated 80 milliseconds after the start 146 of the seventh timer T7.

The offset time 148 for the offset scheduled task is empirically determined by selecting an offset value that captures a predefined percentage of a total runtime of all tasks that are executed to completion. For example, in one embodiment, the lane tracking and fusion module 82 executes the offset scheduled task and the vision based detector module 80 executes the reference scheduled task. Accordingly, the offset time 148 for the lane tracking and fusion module 82 is selected to allow the referenced scheduled tasks to execute to completion in ninety present of the cases. As seen in FIGS. 2 and 4, the vision detector module 80 is located at an execution stage 152 upstream of and communicates data to the vision based detector module 80. In the present example, the empirical data indicates that the referenced scheduled tasks executed by the vision based detector module 80 complete their execution in eighty seconds, in ninety percent of the cases. This means that ten percent of the time, the execution time exceeds 80 milliseconds. Thus, as seen in Table 1, the offset time 148 for the lane tracking and fusion module 82 is eighty milliseconds.

As seen in FIG. 4, regardless if the tasks for the vision based detector module 80 are executed, the third timer T3 for the lane tracking and fusion module 82 is initiated 80 milliseconds after the start 140 of the first timer T1. Accordingly, it is to be appreciated that increasing the offset time 148 decreases the likelihood of frame drop, while decreasing the offset time 148 increases the likelihood of frame drop. Thus, it is also to be appreciated that the heterogeneous multi-core system 12 compensates for dropped frames.

Referring to Table 1 and FIG. 4, each stage 152 of the execution pipeline 150 of the real-time system 16 includes a guaranteed latency based on the offset time 148. For example, since the offset time 148 for the third timer T3 is eighty milliseconds, it follows that the first timer T1 includes a guaranteed latency of eighty milliseconds. Furthermore, as seen in FIG. 4, since each timer T1-T8 is initiated at a specific time, the execution pipeline 150 includes a guaranteed end-to-end latency 156. For example, in the embodiment as shown in FIG. 4, the execution pipeline 150 includes a guaranteed end-to-end latency 156 of 210 milliseconds. It is to be appreciated that an overall value of the guaranteed end-to-end latency 156 (seen in FIG. 4) is determined based on the specific application of the real-time system 16. For example, in the embodiment as shown in the figures, the real-time system 16 is a safety-critical ADAS system and therefore requires a relatively short of brief reaction time. However, if the real-time system 16 is used in an application where reaction times are not as significant, such as a robot that moves at a relatively low speed and is operating in a warehouse, then the overall value of the end-to-end latency 156 may be greater.

Referring back to FIG. 2, each of the plurality of modules 80, 82, 84, 86, 88, 90, 92, 94 execute a scheduled task for one of the logical domains 52A, 52B, 54, 56, 58 at a unique periodicity. For example, in the embodiment as shown in FIG. 2, the vision based detector module 80 and the the lane tracking and fusion module 82 both include a periodicity of 10 Hertz, the object tracking and fusion module 84 includes a periodicity of 20 Hertz, the vehicle dynamics module 86 includes a periodicity of 100 Hertz, the map service module 88 includes a periodicity of 1 Hertz, the localization module 90 includes a periodicity of 10 Hertz, the decision making module 92 includes a periodicity of 10 Hertz, and the vehicle control module 94 includes a periodicity of 100 Hertz. Thus, each module 80, 82, 84, 86, 88, 90, 92, 94 of the disclosed real-time system 16 executes a scheduled task at the unique periodicity. Table 2, which is shown below, is a priority table summarizing a runtime priority for a scheduled task. Specifically, as seen in Table 2 below, the priority table assigns a runtime priority for each of the one or more scheduled tasks, where the priority table is stored in the shared memory 20 of the system-on-chips 14 (seen in FIG. 1).

The runtime priority for each of the one or more scheduled tasks is determined based on the unique periodicity, however, as explained below, if two or more scheduled tasks that are part of the same logical domain 52A, 52B, 54, 56, 58 include the same periodicity, then the scheduled task that is executed downstream in the execution pipeline 150 (FIG. 4) is assigned a priority upgrade. For example, in the embodiment as shown in FIG. 2 and Table 2, the vision based detector module 80 and the lane tracking and fusion module 82 each include the same periodicity of 10 Hertz and are located within the same logical domain 54. Accordingly, since the scheduled tasks executed by the lane tracking and fusion module 82 are downstream of the scheduled tasks executed by the vision based detector module 80, the scheduled tasks executed by the lane tracking and fusion module 82 are assigned a priority upgrade of +1. Thus, in the embodiment as shown in FIG. 2 and Table 2, the vision based detector module 80 includes a runtime priority of 10 and the lane tracking and fusion module 82 includes a runtime priority of 11. It is to be appreciated that scheduled tasks located downstream in the execution pipeline 150 (FIG. 4) are prioritized over scheduled tasks that are located upstream in the execution pipeline 150. Furthermore, since the object tracking and fusion module 84 includes a periodicity of 20 Hertz, the object tracking and fusion module 84 includes a runtime priority of 21. Specifically, the scheduled tasks executed by the object tracking and fusion module 84 includes a priority upgrade of +1 because the vision based detector module 80 is located upstream of the object tracking and fusion module 84.

The fourth logical domain 56 includes the vehicle dynamics module 86 including a runtime priority of 30, the map service module 88 including a priority of 5, and the localization module 90 including a priority of 10. The vehicle dynamics module 86, which is located downstream of the map service module 88 and the localization module 90 of the execution pipeline 150 (FIG. 4), includes the highest runtime priority of 30. This is because the vehicle dynamics module 86 includes a higher periodicity when compared to the remaining two modules 88, 90 in the fourth logical domain 56. The fifth logical domain 58 includes the decision making module 92, which includes a runtime priority of 10, and the vehicle controls module 94, which includes a priority of 31.

TABLE 2

| Periodicity (Hertz) | Runtime Priority |
| --- | --- |
| 100 | 30 (highest) |
| 30 | 25 |
| 20 | 20 |
| 15 | 15 |
| 10 | 10 |
| 1 | 5 |

Figure 5:
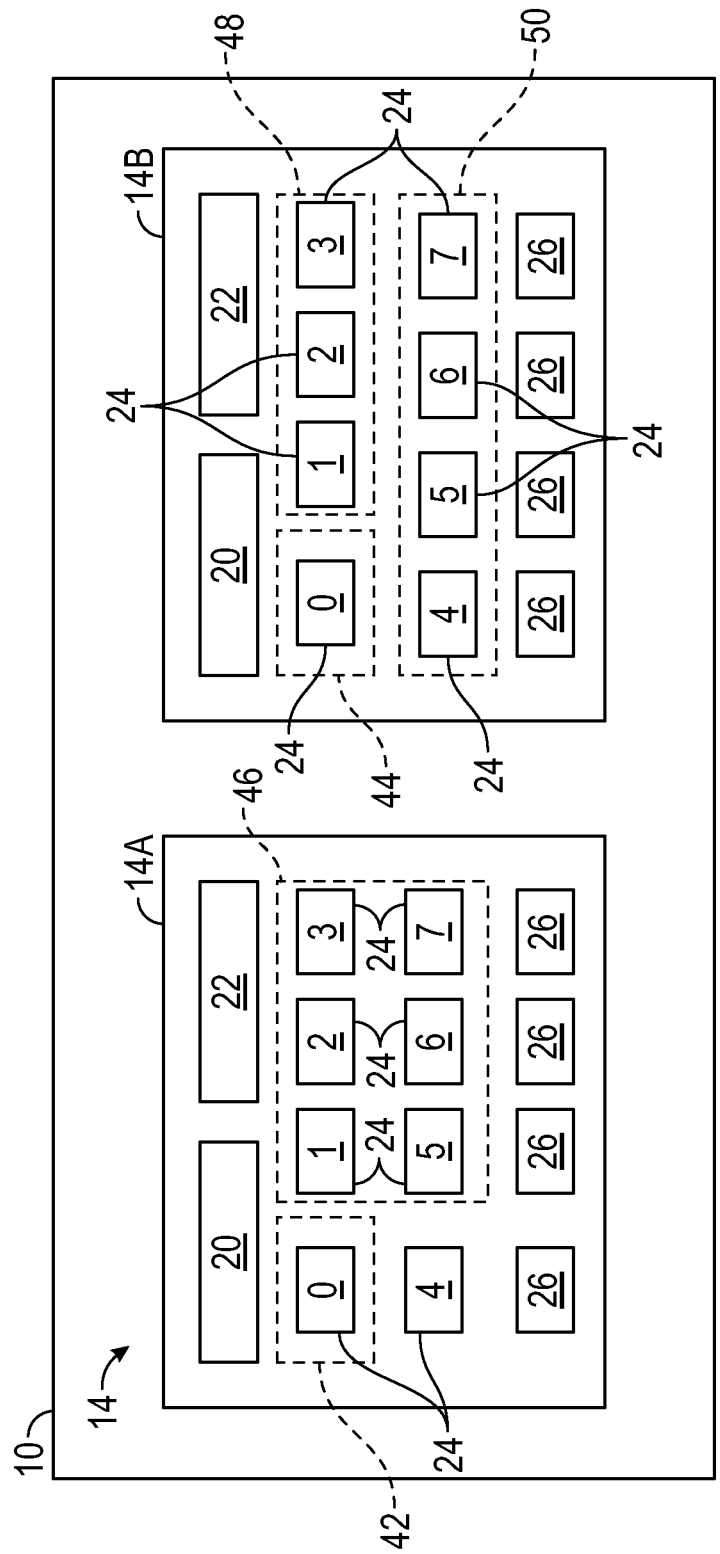
FIG. 5 is an illustration of the computer board shown in FIG. 1 illustrating assigned central processing units (CPUs).

Table. 3 and FIG. 5 illustrate a resource affinity table that allocates the system resources between the logical domains 52A, 52B, 54, 56, 58 (seen in FIG. 2). In the non-limiting embodiment as seen in FIG. 5, each system-on-chip 14A, 14B include a total of eight CPUs 24, where each CPU 24 is assigned an identifier 0-7. As seen in Table 3, each logical domain 52A, 52B, 54, 56, 58 is assigned to one of the CPUs 24 that are part of the heterogeneous multi-core system 12. Moreover, each CPU 24 of each of the system-on-chips 14 is allocated to one of the logical domains 52A, 52B, 54, 56, 58 of the heterogeneous multi-core system 12. Accordingly, it is to be appreciated that revisions and changes to one of the logical domains 52A, 52B, 54, 56, 58 do not introduce or create frame drops in the remaining logical domains 52A, 52B, 54, 56, 58.

TABLE 3

| Logical Domain | Assigned SoC ID | Assigned CPU IDs |
| --- | --- | --- |
| 52A | 0 | 0 |
| 52B | 1 | 0 |
| 54 | 0 | 1, 2, 3, 5, 6, 7 |
| 56 | 1 | 1, 2, 3 |
| 58 | 1 | 4, 5, 6, 7 |

Referring generally to the figures, the disclosed heterogeneous multi-core system as described provides various technical effects and benefits. Specifically, the disclosed heterogeneous multi-core system includes a real-time scheduling system that provides guaranteed latency for each stage of the execution pipeline as well as a guaranteed end-to-end latency. The guaranteed end-to-end latency as described in the present disclosure bounds jitter, and also provides a mechanism to ensure that the disclosed real-time system reacts within an allotted time. The disclosed real-time system may be used to support multiple system-on-chips, where each system-on-chip includes multiple CPUs. Furthermore, the disclosed real-time scheduling system is also scalable and effective for multi-core systems having shared hardware accelerators. The disclosed real-time scheduling system also supports multiple tasks that execute at different rates, without violating real-time. The synchronizers may synchronize two or more inputs having different periodicities together or, in the alternative, the synchronizers change a periodicity or a rate of execution from a single input. Finally, it is to be appreciated that the disclosed real-time scheduling system utilizes embedded hardware in an optimized manner that may result in reduced cost and power consumption when compared to current embedded system that are presently available.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A heterogeneous multi-core system that executes a real-time system for an automobile, the heterogeneous multi-core system comprising:
    a plurality of system-on chips in electronic communication with one another, wherein each system-on-chip includes a plurality of central processing units (CPUs) arranged into a plurality of logical domains;
    a plurality of scheduled tasks that are executed based on an execution pipeline and each execute a specific set of tasks for one of the logical domains, wherein the plurality of scheduled tasks includes:
        at least one offset scheduled task that is executed at an offset time, wherein the offset time for the at least one offset scheduled task is determined by selecting a predefined percentage of a total runtime of cases that are executed to completion; and
        a reference scheduled task located at an execution stage upstream in the execution pipeline relative to the offset scheduled task, wherein the reference scheduled task communicates data to the offset scheduled task and the offset time represents a period of time measured relative to the reference scheduled task, and wherein each stage of the execution pipeline of the real-time system includes a guaranteed latency that is based on the offset time of the at least one offset scheduled task.

2. The heterogeneous multi-core system of claim 1, wherein the execution pipeline includes a guaranteed end-to-end latency.

3. The heterogeneous multi-core system of claim 1, wherein each logical domain executes one or more scheduled tasks, and wherein each scheduled task executes based on a unique periodicity.

4. The heterogeneous multi-core system of claim 3, wherein each of the plurality of system-on-chips include a corresponding shared memory.

5. The heterogeneous multi-core system of claim 4, wherein a priority table indicating a runtime priority for each of the one or more scheduled tasks is stored in the shared memory.

6. The heterogeneous multi-core system of claim 5, wherein the runtime priority for each of the one or more scheduled tasks is determined based on the unique periodicity.

7. The heterogeneous multi-core system of claim 1, further comprising one or more synchronizers, wherein the one or more synchronizers synchronize two or more inputs having different periodicities together and transmit data from the two more inputs to one of the plurality of scheduled tasks.

8. The heterogeneous multi-core system of claim 7, wherein each of the one or more synchronizers includes a trigger.

9. The heterogeneous multi-core system of claim 8, wherein the trigger represents a software event that prompts a corresponding synchronizer to synchronize the two or more inputs together.

10. The heterogeneous multi-core system of claim 1, further comprising one or more synchronizers, wherein the one or more synchronizers changes a periodicity from a single input and transmits data from the single input to one of the plurality of scheduled tasks.

11. The heterogeneous multi-core system of claim 1, wherein each of the plurality of scheduled tasks include a unique periodicity.

12. The heterogeneous multi-core system of claim 1, wherein each system-on-chip further comprises one or more hardware accelerators that are shared between the CPUs.

13. The heterogeneous multi-core system of claim 1, wherein the (Original) real-time system is an advanced driving assistance system (ADAS).

14. The heterogeneous multi-core system of claim 1, wherein each CPU is allocated to one of the plurality of logical domains.

15. A heterogeneous multi-core system that executes a real-time system for an automobile, the heterogeneous multi-core system comprising:
    a plurality of system-on chips in electronic communication with one another, wherein each system-on-chip includes a plurality of CPUs arranged into a plurality of logical domains, and wherein the real-time system is an advanced driving assistance system (ADAS);
    one or more synchronizers, wherein the one or more synchronizers synchronize two or more inputs having different periodicities together; and
    a plurality of scheduled tasks that are executed based on an execution pipeline and each execute a specific set of tasks for one of the logical domains, wherein the one or more synchronizers transmit data from the two more inputs to one of the plurality of scheduled tasks, and wherein the plurality of scheduled tasks includes:
        at least one offset scheduled task that is executed at an offset time, wherein the offset time for the at least one offset scheduled task is determined by selecting a predefined percentage of a total runtime of cases that are executed to completion; and
        a reference scheduled task located at an execution stage upstream in the execution pipeline relative to the offset scheduled task, wherein the reference scheduled task communicates data to the offset scheduled task and the offset time represents a period of time measured relative to the reference scheduled task, and wherein each stage of the execution pipeline of the real-time system includes a guaranteed latency that is based on the offset time of the at least one offset scheduled task.

16. The heterogeneous multi-core system of claim 15, wherein the execution pipeline includes a guaranteed end-to-end latency.

17. The heterogeneous multi-core system of claim 15, wherein each of the one or more synchronizers includes a trigger.

18. The heterogeneous multi-core system of claim 17, wherein the trigger represents a software event that prompts a corresponding synchronizer to synchronize the two or more inputs together.

19. The heterogeneous multi-core system of claim 15, wherein each logical domain executes one or more scheduled tasks, and wherein each scheduled task executes based on a unique periodicity.

20. A heterogeneous multi-core system that executes a real-time system for an automobile, the heterogeneous multi-core system comprising:
a plurality of system-on chips in electronic communication with one another, wherein each system-on-chip includes a plurality of CPUs arranged into a plurality of logical domains, and wherein the real-time system is an advanced driving assistance system (ADAS);
one or more synchronizers; and
a plurality of scheduled tasks that are executed based on an execution pipeline and each execute a specific set of tasks for one of the logical domains, wherein the one or more synchronizers changes a periodicity from a single input and transmits data from the single input to one of the plurality of scheduled tasks, and wherein the plurality of scheduled tasks includes:
at least one offset scheduled task that is executed at an offset time, wherein the offset time for the at least one offset scheduled task is determined by selecting a predefined percentage of a total runtime of cases that are executed to completion; and
a reference scheduled task located at an execution stage upstream in the execution pipeline relative to the offset scheduled task, wherein the reference scheduled task communicates data to the offset scheduled task and the offset time represents a period of time measured relative to the reference scheduled task, and wherein each stage of the execution pipeline of the real-time system includes a guaranteed latency that is based on the offset time of the at least one offset scheduled task.

* * * * *